United States Patent
Honda

(10) Patent No.: US 10,740,899 B2
(45) Date of Patent: Aug. 11, 2020

(54) IMAGE PROCESSING APPARATUS FOR IDENTIFYING REGION WITHIN IMAGE, INFORMATION PROCESSING METHOD, AND STORAGE MEDIUM

(71) Applicant: CANON KABUSHIKI KAISHA, Tokyo (JP)

(72) Inventor: Kinya Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 15/707,822

(22) Filed: Sep. 18, 2017

(65) Prior Publication Data

US 2018/0089835 A1 Mar. 29, 2018

(30) Foreign Application Priority Data

Sep. 27, 2016 (JP) .................................. 2016-188375

(51) Int. Cl.
| | | |
|---|---|---|
| *G06T 7/11* | (2017.01) | |
| *G06F 16/58* | (2019.01) | |
| *G06K 9/32* | (2006.01) | |
| *G06K 9/72* | (2006.01) | |
| *G06T 7/136* | (2017.01) | |

(52) U.S. Cl.
CPC ............ *G06T 7/11* (2017.01); *G06F 16/5866* (2019.01); *G06K 9/325* (2013.01); *G06K 9/72* (2013.01); *G06T 7/136* (2017.01); *G06K 2209/01* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,524,453 | A * | 6/1985 | Egami | ..................... | B07C 3/14 382/101 |
| 8,077,976 | B2 * | 12/2011 | Shiiyama | ............. | G06K 9/2063 382/181 |
| 8,503,773 | B2 * | 8/2013 | Kanatsu | ............. | G06K 9/00463 382/165 |
| 9,280,725 | B2 * | 3/2016 | Kimura | ................... | G06K 9/72 |
| 2005/0140679 | A1 * | 6/2005 | Kaneda | ............... | G06K 9/4647 345/441 |
| 2007/0206884 | A1 * | 9/2007 | Kato | ..................... | G06K 9/72 382/305 |
| 2015/0317530 | A1 * | 11/2015 | Aizawa | ............... | G06K 9/3266 382/182 |
| 2016/0005203 | A1 * | 1/2016 | Kawasaki | ............... | G06T 11/60 382/163 |

FOREIGN PATENT DOCUMENTS

JP 2011-248609 A 12/2011

* cited by examiner

*Primary Examiner* — Tsung Yin Tsai
(74) *Attorney, Agent, or Firm* — Canon U.S.A., Inc. IP Division

(57) ABSTRACT

A plurality of character regions is extracted from an image, candidates for an item value region including an item value corresponding to a predetermined item name are identified from among the plurality of character regions based on a condition for the item value, candidates for a key word region including the predetermined item name are identified from among the plurality of character regions based on a position of each of the identified candidates for the item value region, and the key word region including the predetermined item name is identified from among the identified candidates for the key word region.

8 Claims, 10 Drawing Sheets

FIG. 2

| No. | Issue Date | Medical Date |
|---|---|---|
| 1234 | 2017/01/01 | 2017/01/01 |

Patient Number
012345

Name: John Smith

TOKYO MEDICAL CLINIC
3-00-2, Shimomaruko,
Ota-ku, Tokyo,
〒146-0000

Tel    03-0000-7890

| SUBTOTAL | ¥1,650 |
|---|---|
| Tax 8% | ¥132 |
| Sum Total | ¥1,782 |

FIG. 5

```
Patient Number
    012345                      Name: John Smith

No.      Issue Date              Medical Date 1234     2017/01/01              2017/01/01

TOKYO MEDICAL CLINIC            SUBTOTAL     ¥1,650
3-00-2, Shimomaruko,
Ota-ku, Tokyo,                  Tax 8%         ¥132
〒146-0000
                                Sum Total    ¥1,782
Tel    03-0000-7890
```

Patient Number
012345
Name: John Smith

601
No. Issue Date
1234 2017/01/01
602

603
Medical Date
2017/01/01
604

TOKYO MEDICAL CLINIC
3-00-2, Shimomaruko,
Ota-ku, Tokyo,
〒146-0000

Tel 03-0000-7890

SUBTOTAL ¥1,650
Tax 8% ¥132
Sum Total ¥1,782

IMAGE PROCESSING APPARATUS FOR IDENTIFYING REGION WITHIN IMAGE, INFORMATION PROCESSING METHOD, AND STORAGE MEDIUM

BACKGROUND

Field of the Disclosure

The present application generally relates to image processing and, more particularly, to an image processing apparatus for identifying a region within an image, an image processing method, and a storage medium.

Description of the Related Art

Heretofore, there has been known a system for identifying a region in which a name, a total amount, and the like are described on a scanned image of a business form or the like, and performing character recognition to extract information. A technique for extracting specific information from an atypical document in which positions where a name, a total amount, and the like are described vary has also been known. When information is extracted from an atypical document, for example, an item name is preliminarily set as a key word, and the key word is identified by performing character recognition on the scanned image, thereby obtaining a character string in the vicinity (right, below, etc.) of the key word as the item value corresponding to the key word.

Further, Japanese Patent Laid-Open No. 2011-248609 discloses a technique for obtaining, for a character string in an atypical document, an item value by calculating a key word likelihood indicating the likelihood of the key word, and an item value likelihood indicating the likelihood of the item value, and further calculating an arrangement likelihood indicating the validity of an arrangement relationship of a character string pair.

However, the character recognition accuracy in character recognition processing is not 100%. It is assumed that recognition errors may occur due to contamination of an image, blurring of characters, or the like during scanning. Accordingly, the key word region cannot be detected on the scanned image in some cases.

SUMMARY

According to one or more aspects of the present disclosure, an image processing apparatus extracts a plurality of character regions from an image, identifies, from among the plurality of character regions, candidates for an item value region including an item value corresponding to a predetermined item name, based on a condition for the item value, identifies, from among the plurality of character regions, candidates for a key word region including the predetermined item name, based on a position of each of the identified candidates for the item value region, and identifies, from among the identified candidates for the key word region, the key word region including the predetermined item name.

Further features of the present disclosure will become apparent from the following description of exemplary embodiments with reference to the attached drawings.

BRIEF DESCRIPTION OF THE DRAWINGS

FIG. 2 is a diagram illustrating an example of a scanned image of a business form according to one or more aspects of the present disclosure.

FIG. 5 is a diagram illustrating an example of an image obtained after ruled line removal processing according to one or more aspects of the present disclosure.

FIG. 6 is a diagram illustrating a result of setting character regions for the image obtained after the ruled line removal processing according to one or more aspects of the present disclosure.

DESCRIPTION OF THE EMBODIMENTS

Various exemplary embodiments, features, and aspects of the disclosure will be described in detail below with reference to the drawings.

Figure 1:
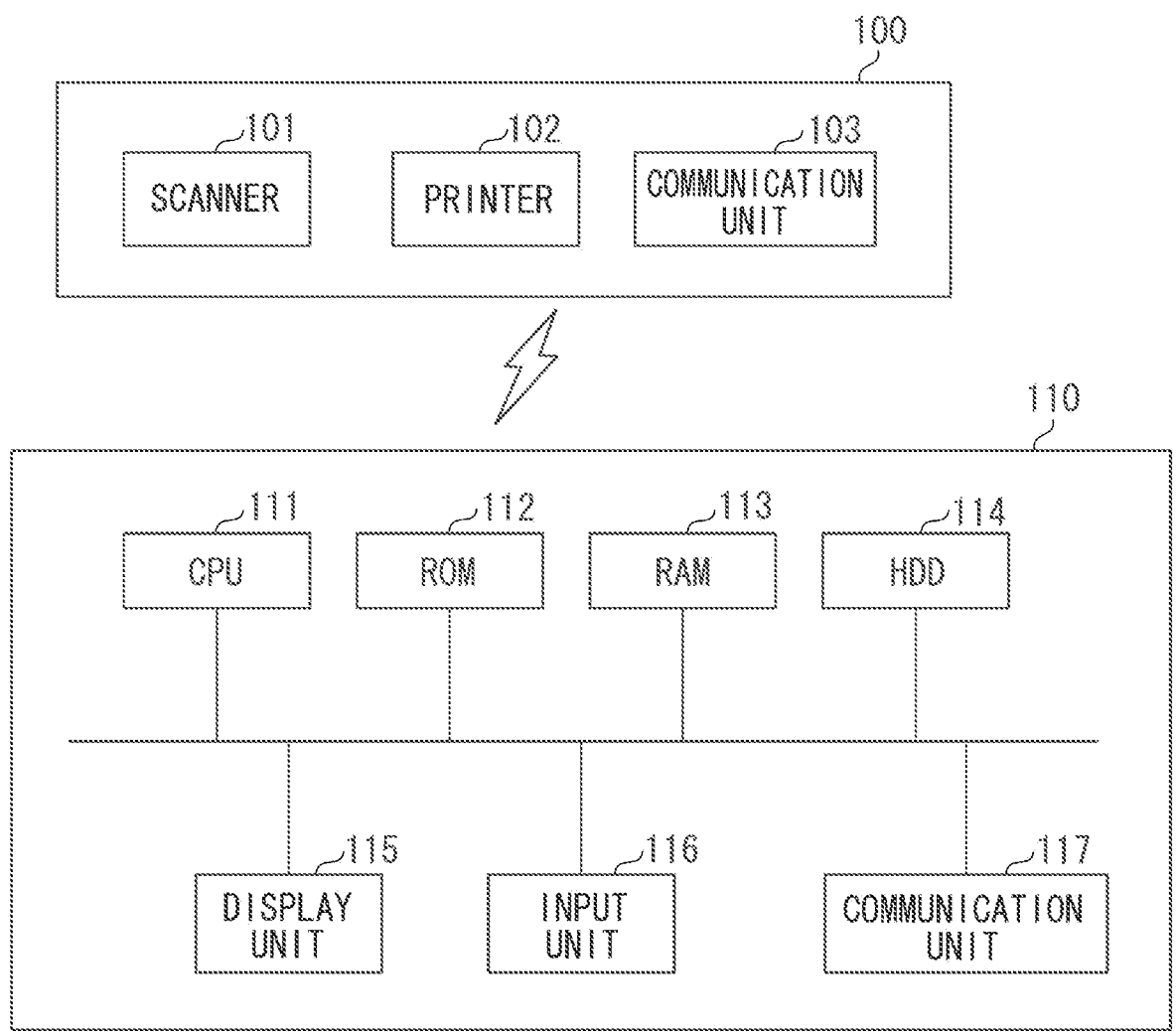
FIG. 1 is a diagram illustrating an image processing system according to one or more aspects of the present disclosure.

FIG. 1 is a diagram illustrating an image processing system according to a first exemplary embodiment. The image processing system includes a copier 100 and an image processing apparatus 110. The copier 100 includes a scanner 101, a printer 102, and a communication unit 103. The scanner 101 scans a document and generates a scanned image. The printer 102 forms an image. The communication unit 103 communicates with an external apparatus via a network.

The image processing apparatus 110 includes a central processing unit (CPU) 111, a read-only memory (ROM) 112, a random access memory (RAM) 113, a hard disc drive (HDD) 114, a display unit 115, an input unit 116, and a communication unit 117. The CPU 111, which may include one or more processors and one or more memories, reads out a control program stored in the ROM 112 and executes various processing. The RAM 113 is used as a temporary storage area, such as a main memory or a work area for the CPU 111. The HDD 114 stores various data, various programs, and the like. Functions and processing of the image processing apparatus 110 described below are implemented in such a manner that the CPU 111 reads out the programs stored in the ROM 112 or the HDD 114, and executes the programs.

The units described throughout the present disclosure are exemplary and/or preferable modules for implementing processes described in the present disclosure. The modules can be hardware units (such as circuitry, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

The communication unit 117 performs communication processing with the external apparatus via the network. The display unit 115 displays various pieces of information. The input unit 116 includes a keyboard and a mouse, and accepts various user operations. The display unit 115 and the input unit 116 may be integrally provided, like a touch panel. The display unit 115 may perform projection using a projector. The input unit 116 may recognize the position of a fingertip on a projected image by using a camera.

In the present exemplary embodiment, the scanner 101 of the copier 100 scans a business form or the like, and generates a scanned image. The communication unit 103 transmits the scanned image to the image processing apparatus 110. In the image processing apparatus 110, the communication unit 117 receives the scanned image, and stores the scanned image in the storage unit such as the HDD 114. The business form to be scanned by the scanner 101 is an atypical business form. The term "atypical business form" refers to a business form that includes a character string of a key word to be described, or a word having the same meaning as that of the character string, but positions where these characters are described vary (the format of the business form is unknown). In the atypical business form, the position of each ruled line also varies.

FIG. 2 is a diagram illustrating an example of a scanned image 201 of a business form. In the scanned image 201, for example, "Issue Date" 202 is a key word and the item value corresponding to the key word is "2017/01/01" 203. Characters shown in the scanned image 201 are referred to as original characters. The storage unit, such as the HDD 114, of the image processing apparatus 110 stores the key word to be processed and information about the item value corresponding to the key word in such a manner that the key word and the information are associated with each other. Position relationship information indicating the position relationship between the item value and the key word is also stored in the HDD 114.

The key word for the item name, item value, and position relationship information described below are set to the scanned image 201 illustrated in FIG. 2.

Key word for item name: Issue Date
Item value: XXXX/XX/XX
Position relationship information: The item value is present within a range of 20 mm downward from the key word. Numbers described as year, month, and day of the item value for Issue Date vary depending on the document to be scanned. In this manner, X is inserted at positions where indefinite characters (numbers) are input. That is, X in "XXXX/XX/XX" of the item value indicates any one of integers 0 to 9. Such a notation is generally called normal notation.

Also assume that a determination condition for determining whether or not the region is the key word region based on a result of character recognition processing performed on a character string region obtained in a target image as a search target, a search condition for searching for the item value, and position relationship information about the key word and the item value are stored in the HDD 114 or the like. The CPU 111 records the key word, the item value, the conditions for determining the key word, the search condition for the item value, and the position relationship information on the HDD 114 or the like, for example, according to a user operation.

Figure 3:
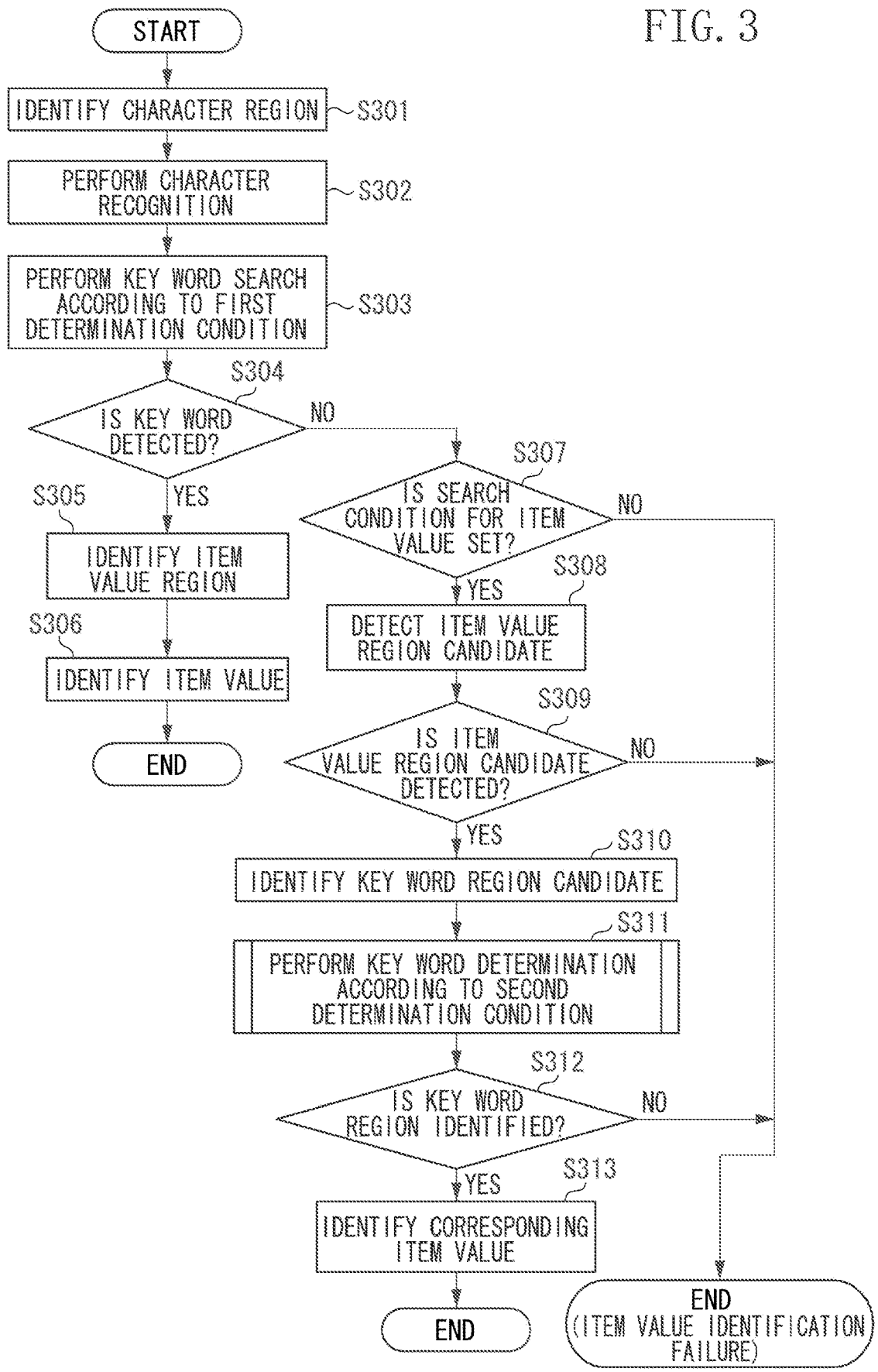
FIG. 3 is a flowchart illustrating item value identification processing one or more aspects of the present disclosure.

FIG. 3 is a flowchart illustrating item value identification processing performed by the image processing apparatus 110. A case of identifying the item value corresponding to the key word "Issue Date" will now be described by way of example. Further, in the present exemplary embodiment, the image in which the item value is identified is a scanned image obtained by the scanner 101 of the copier 100, and the scanned image is received by the communication unit 117 via the network and stored in the HDD 114.

In step S301, the CPU 111 first selects one scanned image to be processed from the HDD 114 according to a user operation. Further, character regions are extracted by performing processing as described below in the selected scanned image. An example of the processing for extracting character regions will now be described. This processing includes four processing steps, i.e., binarization processing, black pixel block detection processing, ruled line removal processing, and character region extraction processing.

First, the binarization processing will be described. The CPU 111 binarizes the scanned image, thereby obtaining a binary image. Through the binarization, in the scanned image, a pixel whose color is darker than a threshold is a black pixel, and a pixel whose color is lighter than the threshold is a white pixel. The following description is made assuming that the resolution of the scanned image is 100 DPI. However, the resolution of the scanned image is not limited to 100 DPI.

Next, the black pixel block detection processing will be described. The CPU 111 traces an outline of eight-connected black pixels on the binary image obtained by the binarization processing, thereby detecting black pixel blocks that are present in a row in any one of eight directions. The term "eight-connected" means that pixels having the same color (black in this case) as the color of a pixel of interest are arranged in a row in one of the eight directions of top left, left, bottom left, bottom, bottom right, right, top right, and top with respect to the pixel of interest. Note that the term "four-connected" means that pixels having the same color are arranged in a row in one of the four directions of left, bottom, right, and top.

Figure 4:
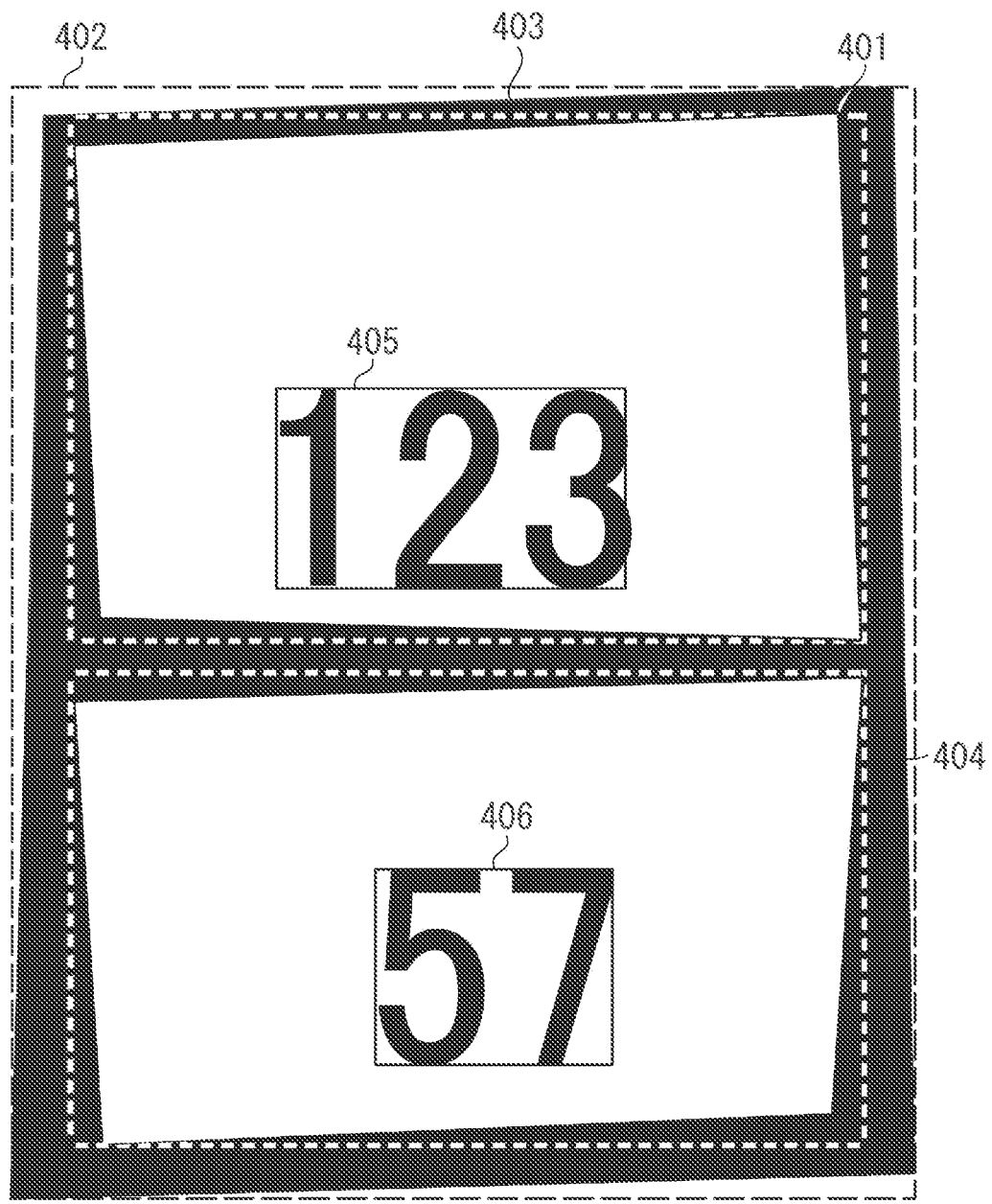
FIG. 4 is an explanatory diagram illustrating black pixel block detection processing according to one or more aspects of the present disclosure.

Assume that a single black pixel (isolated point) occurring when eight adjacent pixels present in the eight directions are not black pixels is noise, and such a single black pixel is not detected as a black pixel block. On the other hand, a black pixel occurring when a black pixel is present in at least one of the eight adjacent pixels present in the eight directions is detected as a black pixel block, together with the black pixel adjacent to the detected black pixel. A black pixel block 401 is an example of the black pixel block detected by the CPU 111. The CPU 111 calculates position information about a circumscribed rectangle of the detected black pixel block (i.e., X, Y-coordinate information about four apexes). Assume that an X-axis extends rightward and a Y-axis extends downward. A width indicates a length in the X-axis direction and a height indicates a length in the Y-axis direction. A circumscribed rectangle 402 illustrated in FIG. 4 is the circumscribed rectangle of the black pixel block 401. The expression of "rectangle" used herein represents a rectangle having four sides parallel to one of the X-coordinate and the Y-coordinate, and does not include an oblique rectangle.

Next, the ruled line removal processing will be described. The CPU 111 determines whether the detected black pixel block meets the conditions described below, and determines that the black pixel block that meets the conditions is the black pixel block that constitutes a straight line.

The width of the circumscribed rectangle of the black pixel block is equal to or greater than a threshold, and the height of the circumscribed rectangle is equal to or lower than a threshold. Alternatively, the width of the circumscribed rectangle is equal to or smaller than the threshold and the height of the circumscribed rectangle is equal to or higher than the threshold.

Further, the CPU 111 determines that the black pixel block that meets all the conditions described below is the black pixel block that constitutes a ruled line of a table.

The width and height of the circumscribed rectangle of the black pixel block are equal to or greater than a threshold (e.g., 100 pixels, 0.25 cm or more).

A filling factor for the black pixel block within the circumscribed rectangle is equal to or less than a threshold (e.g., the percentage of the black pixel block with respect to the circumscribed rectangle is 20% or less).

A difference between a maximum width of the black pixel block and the width of the circumscribed rectangle is small, and a difference between a maximum height of the black pixel block and the height of the circumscribed rectangle is also small (e.g., the difference in pixel between the maximum width of the black pixel block and the width of the circumscribed rectangle and the difference in pixel between the maximum height of the black pixel block and the height of the circumscribed rectangle are 10 pixels or less).

The CPU 111 records, on the HDD 114, the position information about the circumscribed rectangle of the black pixel block that is determined to constitute a ruled line of a table. The circumscribed rectangle including the recorded position information is hereinafter referred to as a table region. As a result of the determination described above, the black pixel block 401 illustrated in FIG. 4 is determined to constitute a ruled line of a table. Accordingly, the circumscribed rectangle 402 is determined to be the table region. The CPU 111 removes the black pixel block that is determined to constitute a linear curve or a ruled line of a table. FIG. 5 is a diagram illustrating an image 501 which is obtained by removing straight lines and ruled lines from the scanned image 201. Note that processing for determining a table region and a table ruled line is not limited to the processing described above, and the determination processing may be performed by other methods.

Next, the character region extraction processing will be described. The CPU 111 sets a circumscribed rectangle to all black pixel blocks in the image obtained after removing the black pixel blocks constituting straight lines and ruled lines. Further, the CPU 111 determines whether a distance between circumscribed rectangles is within a threshold (e.g., 20 pixels, 0.5 cm). Specifically, the CPU 111 selects circumscribed rectangles one by one, detects circumscribed rectangles with a distance from the selected circumscribed rectangles being within a threshold, and combines the detected circumscribed rectangles. In other words, the CPU 111 sets a new circumscribed rectangle that circumscribes both the circumscribed rectangles, but instead deletes the plurality of circumscribed rectangles.

After setting of a new circumscribed rectangle and deletion of the plurality of circumscribed rectangles are completed, the CPU 111 selects, one by one, the circumscribed rectangles within the recognized cell in order from the top, and sequentially combines the circumscribed rectangles, the distance between which is within the threshold, with each other. The processing described above is repeated. In other words, the processing of combining the circumscribed rectangles is repeated until there is no circumscribed rectangles the distance between which is within the threshold. The circumscribed rectangles set after completion of the processing described above are character regions. FIG. 6 is a diagram illustrating a result of extracting character regions from the image 501 obtained after the ruled line removal processing. For example, a character region 601 is a character region including a character string "Issue Date". A character region 602 is a character region including an item value "2017/01/01" corresponding to a key word "Issue Date". A character region 603 is a character region including a character string of a key word "Medical Date". A character region 604 is a character region including an item value "2017/01/01" corresponding to the key word "Medical Date".

Referring again to FIG. 3, after the processing of step S301, in step S302, the CPU 111 performs character recognition processing on each character region. Characters obtained by the character recognition are hereinafter referred to as recognized characters. The recognized characters are character codes obtained by performing the character recognition processing on original characters in the scanned image, or the characters respectively corresponding to the character codes. The recognized characters obtained as a result of the character recognition are recorded on the storage unit, such as the RAM 113, in such a manner that the recognized characters are each associated with the corresponding character region.

Next, in step S303, the CPU 111 searches for a character that matches a key word based on the recognized characters in each character region obtained in step S301. For example, a character string that matches the key word "Issue Date" is searched for from each of a plurality of character strings obtained from the image illustrated in FIG. 6. Assume that determination conditions for the CPU 111 to determine that a character string matches the key word are preliminarily stored in the HDD 114. In order to distinguish the determination condition used in step S303 from the determination condition used in step S313 described below, the determination condition used in step S303 is hereinafter referred to as a first determination condition, and the determination condition used in step S313 is hereinafter referred to as a second determination condition.

The first determination condition is a condition for determining that a recognized character matches a key word when the reliability for the recognized character is equal to or higher than a first reliability threshold. The reliability described herein refers to an indication of a likelihood of a key word. As the likelihood of the key word is higher, the reliability indicates a higher value. The numerical range of the reliability is, for example, 0 to 100, but the numerical range is not limited to that illustrated in the exemplary embodiments.

Next, in step S304, if the key word is detected from any one of the character regions (YES in step S304), the CPU 111 determines the region in which the key word is detected to be the key word region, and the processing proceeds to step S305. If the key word is not detected (NO in step S304), the processing proceeds to step S307. For example, if a character recognition error occurs in the character recognition processing on the character region 601 illustrated in FIG. 6, the key word "Issue Date" of the item name is not detected, and thus the processing proceeds to step S307.

In step S305, the CPU 111 identifies an item value region from the character region based on the position of the key word region and the position relationship information about the key word with respect to the item value. In this case, the item value region is a region representing the item value. In the example illustrated in FIG. 6, when the character region 601 is identified as the key word region based on the position relationship information indicating that the item value region is present within a range of 20 mm downward from the bottom side of the character region for the key word, the character region 602 is identified as the item value region.

Next, in step S306, the CPU 111 determines whether or not the recognized characters in the item value region identified based on the position relationship information match the setting value of the item value. For example, the CPU 111 determines whether the recognized character in the corresponding item value region match the format of the setting value "XXXX/XX/XX" of the item value for the key word "Issue Date". When the recognized characters match the setting value of the item value, the CPU 111 identifies the recognized characters as the item value, and terminates the processing. When the recognized characters do not match the setting value of the item value, the CPU 111 determines that the identification of the item value has failed and terminates the processing.

On the other hand, in step S307, the CPU 111 confirms whether or not a search condition for the item value is set. Assume in the present exemplary embodiment that the setting value of the item value (e.g., a regular expression for date "XXXX/XX/XX") is set as the search condition. If the search condition for the item value is set (YES in step S307), the processing proceeds to step S308. If the search condition for the item value is not set (NO in step S307), the CPU 111 determines that the identification of the item value has failed and terminates the processing.

In step S308, the CPU 111 searches for item value region candidates in accordance with the search condition for the item value based on a result of the character recognition processing on the scanned image. If item value region candidates are detected (YES in step S309), the processing proceeds to step S310. If no item value region candidates are detected (NO in step S309), the CPU 111 determines that the identification of the item value has failed and terminates the processing. The processing of step S308 is an example of the recognition identification processing for identifying item value region candidates.

For example, in the example illustrated in FIG. 6, the character region 602 "2017/01/01" is located below the character region 601 "Issue Date". In addition, the character region 604 "2017/01/01" is located below the character region 603 "Medical Date". In this case, in the processing of step S308, not only the character region 602, but also the character region 604 is detected as an item value region candidate.

In step S310, the CPU 111 identifies key word region candidates from among the character regions in the vicinity of the item value region candidates based on the item value region candidates and the position relationship information. The term "key word region candidate" described herein refers to a region that is determined to be a key word region based on the position relationship information when an item value region candidate is identified as the item value region. For example, as for the position relationship information indicating that the item value is present within a range of 20 mm downward from the key word, a character region located within a range of mm upward from the item value region candidate is identified as a key word region candidate. In the example illustrated in FIG. 6, the character regions 601 and 603 are identified as key word region candidates for the character regions 602 and 604, respectively, which are item value region candidates. The processing of step S312 is an example of region identification processing for identifying key word region candidates.

Next, in step S311, the CPU 111 determines a key word region candidate which includes the recognized characters that match the key word in the combinations of recognized characters of each key word region candidate and has a highest reliability among the key word region candidates, in accordance with the second determination condition based on the recognized characters in the key word region candidates. In this case, the second determination condition is a condition different from the first determination condition used in step S303. The second determination condition is used to determine whether the recognized characters match the key word, and a second reliability threshold is a value smaller than the first reliability threshold for the first determination condition.

Figure 7:
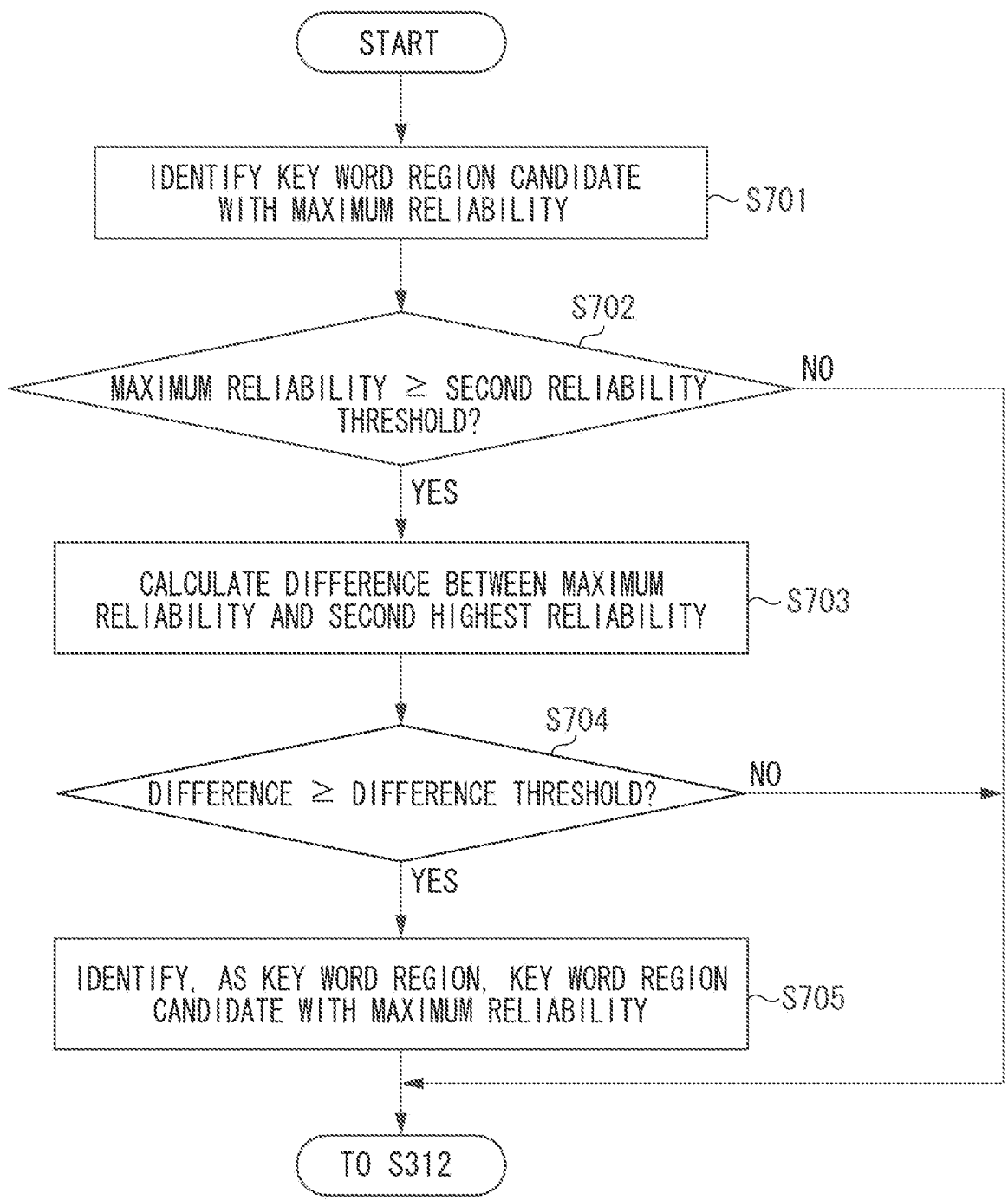
FIG. 7 is a flowchart illustrating key word determination processing according to one or more aspects of the present disclosure.

FIG. 7 is a flowchart illustrating detailed processing in the key word determination processing (S311). In step S701, the CPU 111 identifies, from among the key word region candidates identified in step S310, a key word region candidate which includes a combination of recognized characters that match the key word and has a maximum value of reliability for the combination. Next, in step S702, the CPU 111 compares the maximum value of the reliability with the preliminarily set second reliability threshold. If the maximum value of the reliability is equal to or greater than the second reliability threshold (YES in step S702), the processing proceeds to step S703. If the maximum value of the reliability is smaller than the reliability threshold (NO in step S702), the processing proceeds to step S312.

In step S703, the CPU 111 identifies a second highest reliability among the reliabilities of the key word region candidates identified in step S310. Further, the CPU 111 calculates a difference between the maximum value of the reliability and the second highest reliability. Next, in step S704, the CPU 111 compares the difference calculated in step S703 with a preliminarily set difference threshold. If the difference is equal to or greater than the difference threshold (YES in step S704), the processing proceeds to step S705. If the difference is smaller than the difference threshold (NO in step S704), the CPU 111 proceeds the processing to step S312. In step S705, the CPU 111 identifies, as the key word region, the key word region candidate having a reliability indicating a maximum value. After that, the processing proceeds to step S312. Note that the processing of step S311 is an example of the region identification processing for identifying the key word region based on a result of determination based on the second determination condition.

For example, when the maximum value of the reliability is 60% and the second highest reliability is 30%, the difference between the reliabilities is 30%. When the difference is large to some extent, it can be considered that the key word region candidate having the reliability indicating the maximum value is highly likely to be identified as the key word region. On the other hand, assume that the maximum value of the reliability is 60% and the second highest reliability is 55%. In this case, it can be considered that the determination of the key word region candidate having the reliability indicating the maximum value as the key word region is highly likely to be a false determination. Accordingly, in the present exemplary embodiment, not only the value of the maximum reliability, but also whether or not the difference between the maximum value of the reliability and the second highest reliability is equal to or greater than the difference threshold is evaluated.

Referring again to FIG. 3, after the processing of step S311, in step S312, the CPU 111 confirms whether or not the key word region can be identified. If the key word region can be identified (YES in step S312), the processing proceeds to step S313. If the key word region cannot be identified (NO in step S312), the CPU 111 determines that the identification of the key word and the item value has failed and terminates the processing. In step S313, the CPU 111 identifies, as the item value region, the item value region candidate corresponding to the identified key word region, and identifies the recognized character in the item value region as the item value. For example, in the example illustrated in FIG. 6, when the character region 601 is identified as the key word region, the character region 602, which is the corresponding item value region candidate, is identified as the item value region, and the recognized character "2017/01/01" in the character region 602 is identified as the item value.

As described above, if the key word cannot be identified by key word search using the first determination condition, the image processing apparatus 110 narrows down the key word region candidates based on the item value, and determines the key word region using the second determination condition. Consequently, the key word region can be identified accurately.

Modified examples of the exemplary embodiments will be described below. As a first modified example, in steps S303 and S311, the processing for determining whether or not the recognized characters match the key word is not limited to the processing described in the first exemplary embodiment. The CPU 111 may use a determination condition for determining that the recognized characters match the key word, for example, when the recognized characters match the key word at a predetermined percentage with respect to the number of characters included in the key word.

Character recognition results obtained by an optical character reader (OCR) may include a plurality of candidates for a single character string. For example, like in a case where "1ssue Datte" is obtained as a first candidate as a character recognition result for the character string "Issue Date", the character "1" which is similar to the character "I" may be obtained as the first candidate. Further, "Issue Date" may be obtained as a second candidate. Accordingly, the CPU 111 may calculate a value (reliability) indicating the likelihood of the key word based on whether or not the key word is included in the first to N-th candidates. For example, in the case of using the first to fourth candidates, the reliability is 100% when the first candidate matches the key word; the reliability is 75% when the second candidate matches the key word; the reliability is 50% when the third candidate matches the key word; and the reliability is 25% when the fourth candidate matches the key word. Weighting or the like may be performed on the value.

"N" number of recognized character candidates may be used for the first determination condition, and "N+1" number of recognized character candidates may be used for the second determination condition. In a case where the second determination condition is used, the CPU 111 refers to a larger number of candidates in the OCR recognition result than the number of candidates to be referred to when the key word determination processing is performed using the first determination condition. In general, as the number of candidates in the OCR recognition result to be referred to is increased, the processing time increases. However, in the present exemplary embodiment, the number of candidates in the OCR recognition result to be referred to is increased not for all character regions obtained from the scanned image but only for the key word region candidates. Therefore, the key word can be identified with high accuracy while minimizing the deterioration of the performance. Note that the number of candidates for the second determination condition is not limited to "N+1", as long as the number of candidates for the second determination condition is larger than the number of candidates for the first determination condition.

Figure 8:
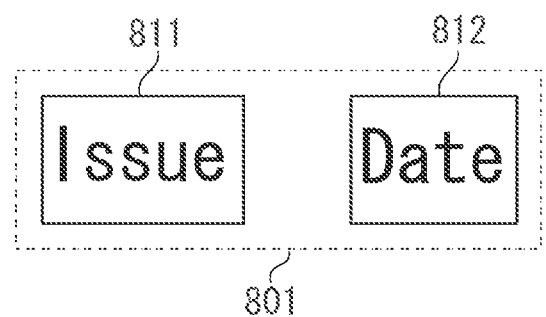
FIG. 8 is an explanatory diagram illustrating a second determination condition according to one or more aspects of the present disclosure.
Figure 9:
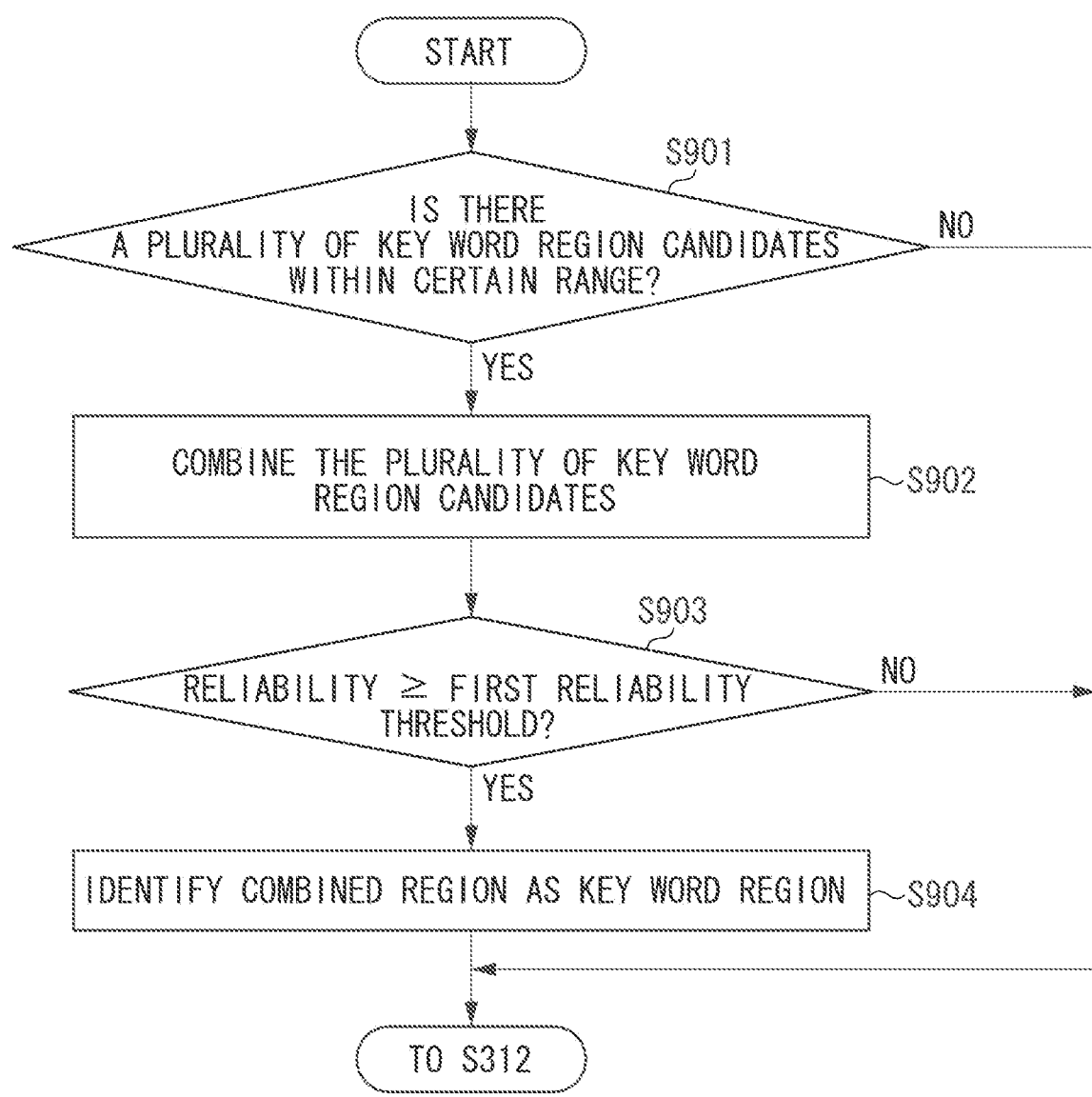
FIG. 9 is a flowchart illustrating key word determination processing according to according to one or more aspects of the present disclosure.

As a second modified example, the second determination condition is not limited to the processing described in the first exemplary embodiment, as long as the second determination condition is a condition different from the first determination condition. A modified example of the second determination condition will be described. FIG. 8 is an explanatory diagram illustrating a modified example of the second determination condition. As illustrated in FIG. 8, the second determination condition is a condition corresponding to a case where a region that is supposed to be recognized as a single character region 801 is erroneously identified as two character regions 811 and 812. For example, there is a possibility that the region may be erroneously identified as another character string due to the effect of, for example, noise or separation of characters. FIG. 9 is a flowchart illustrating detailed processing in the key word determination processing (S311) performed in this case.

In step S901, the CPU 111 confirms whether or not there is a plurality of key word region candidates within a certain range. If there is a plurality of key word region candidates within a certain range (YES in step S901), the processing proceeds to step S902. If a plurality of key word region candidates is not present within a certain range (NO in step S901), the processing proceeds to step S312.

In step S902, the CPU 111 combines the plurality of key word region candidates, which are determined to be present within a certain range in step S901, into one region. A single combined region is hereinafter referred to as a combined region. Through this processing, in the example illustrated in FIG. 8, the character regions 811 and 812 identified as the key word region candidates are combined into a single combined region 801.

Next, in step S903, the CPU 111 compares the reliability of the combined region with the first reliability threshold. Thus, in this example, the value used as the reliability threshold (first reliability threshold) for the first determination condition is also used as the reliability threshold. If the reliability of the combined region is equal to or higher than the first reliability threshold (YES in step S903), the processing proceeds to step S904. If the reliability of the combined region is lower than the first reliability threshold (NO in step S903), the processing proceeds to step S312. In step S904, the CPU 111 identifies the combined region as the key word region, and the processing proceeds to step S312. Note that, as described in the exemplary embodiments, the corresponding first determination condition is used to determine whether or not characters match the key word based on the character recognition result for each character region and the key word comparison result.

Next, other modified examples of the second determination condition will be described. The second determination condition according to the other modified examples is used to identify, from among a plurality of key word region candidates, a key word region including unique characters common to the correct key word. For example, when there is only one key word region candidate including the first character "I" for the key word "Issue Date", it is determined that the key word region candidate is identified as the key word region.

Figure 10:
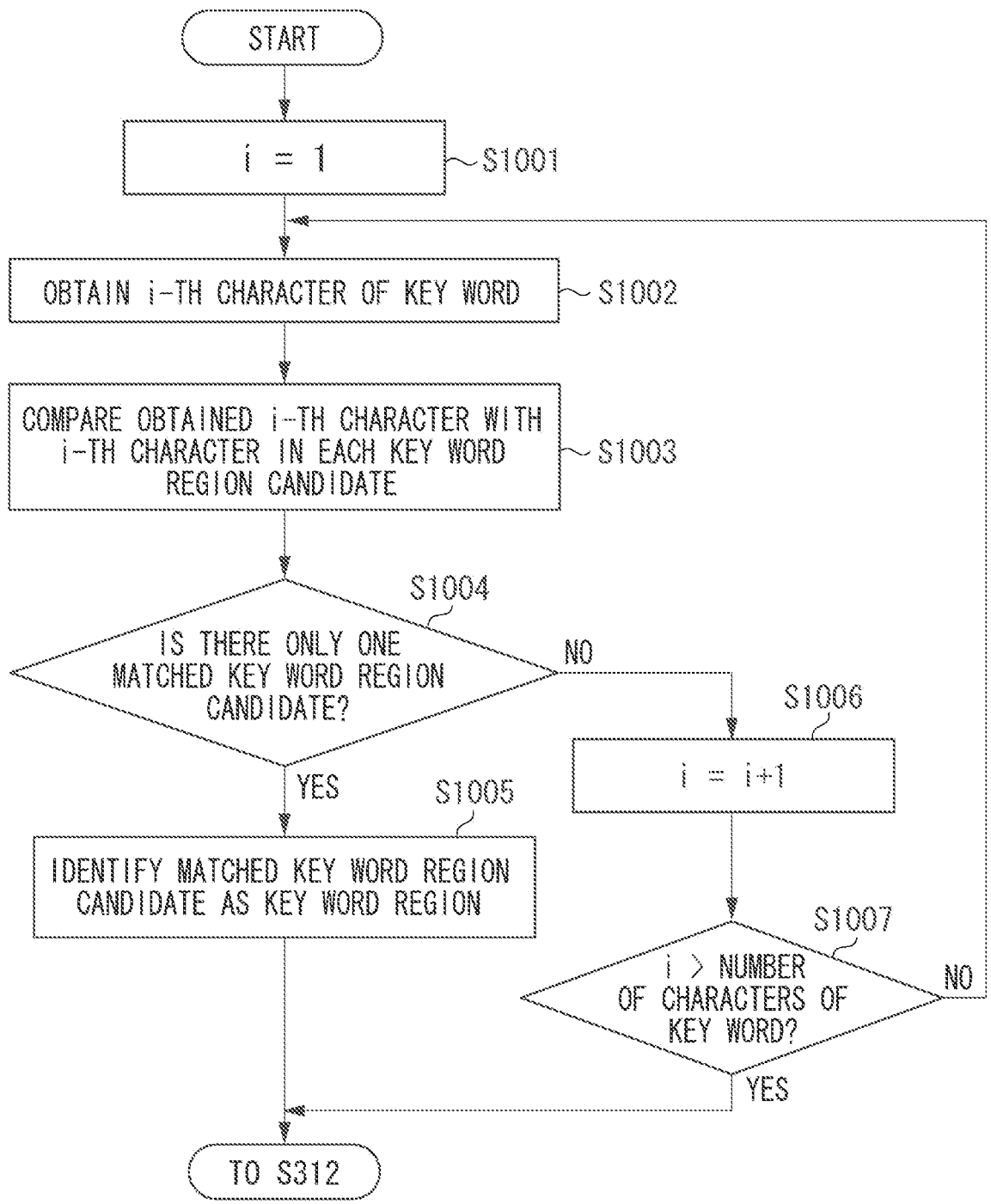
FIG. 10 is a flowchart illustrating key word determination processing according to one or more aspects of the present disclosure.

FIG. 10 is a flowchart illustrating detailed processing in the key word determination processing (S311) according to this example. In step S1001, the CPU 111 sets "1" to a variable i. Next, in step S1002, the CPU 111 obtains an i-th character of the correct key word. When the key word is "Issue Date", the character "I" is obtained. Next, in step S1003, the CPU 111 compares the i-th character of the correct key word obtained in step S1002 with the i-th character in each key word region candidate.

Next, in step S1004, the CPU 111 confirms whether or not there is only one key word region candidate including the i-th character that matches the i-th character of the key word compared in the comparison of step S1003. If there is only one key word region candidate including the i-th character that matches the i-th character of the key word (YES in step S1004), the processing proceeds to step S1005. If the number of key word region candidates including the i-th character that matches the i-th character of the key word is not only one (NO in step S1004), the processing proceeds to step S1006. The case where the number of key word region candidates including the i-th character that matches the i-th character of the key word is not only one includes a case where the i-th character in a plurality of key word regions matches the i-th character of the key word, and a case where there is no key word region candidate including the i-th character that matches the i-th character of the key word. In step S1005, the CPU 111 identifies, as the key word region, the key word region candidate including the i-th character that matches the i-th character of the key word, and then the processing proceeds to step S312.

In step S1006, the CPU 111 adds "1" to the variable i. Next, in step S1007, the CPU 111 confirms whether or not the variable i exceeds the number of characters of the correct key word. If the variable i exceeds the number of characters of the key word (YES in step S1007), the CPU 111 proceeds the processing to step S312. If the variable i does not exceed the number of characters of the key word (NO in step S1007), the processing proceeds to step S1002. An example in which the comparison is made per character has been described above. However, the unit for comparison is not limited to each character, as long as a number of characters less than the number of characters of the key word, or only some of the characters of the key word are used. Any one of the determination conditions may be used, and combinations of some of the conditions described above may also be used.

As a third modified example, the image processing apparatus 110 may skip performing the key word region identification processing using the first determination condition so that the processing may proceed to step S307 after the processing of step S302, and may identify the key word region from among the item value region candidates.

As a fourth modified example, the position relationship between a key word and an item value is not limited to the positional relationship illustrated in the exemplary embodiments. For example, the position relationship may be set in such a manner that item values are located leftward and upward from the key word.

As a fifth modified example, if no item value region candidates can be detected in step S309 (NO in step S309), the image processing apparatus 110 may identify a pair of a key word region candidate and an item value candidate region based on the position relationship between the key word and the item value. The image processing apparatus 110 may perform the processing of step S311 and subsequent steps on the identified pair. For example, for the position relationship indicating that the item value is present within a range of 20 mm downward from the key word, an upper character region of a pair of character regions is identified as a key word region candidate. Accordingly, the image processing apparatus 110 performs the processing of S311 on the upper character region.

According to the exemplary embodiments described above, the key word region can be identified accurately.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors and one or more memories (e.g., central processing unit (CPU), micro processing unit (MPU), or the like) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-188375, filed Sep. 27, 2016, which is hereby incorporated by reference herein in its entirety.

What is claimed is:

1. An image processing apparatus comprising:
 a memory that stores instructions; and
 a processor that causes, based on the instructions stored in the memory, the image processing apparatus to:
 perform character recognition on an image of a document;
 search, based on a result of the character recognition, the image for an item name which corresponds to preregistered characters; and
 perform, in a case where the item name is not found by searching for the item name, a recognizing process for recognizing an item value which is included in the image based on the result of the character recognition and a predetermined condition, and then specify the item name based on the recognized item value wherein the image includes the item value and an item name corresponding to the item value,
 wherein the recognizing process is not performed in a case where the item name is found by searching for the item name.

2. The image processing apparatus according to claim 1, wherein the predetermined condition is a format of the item value.

3. The image processing apparatus according to claim 2, wherein the format of the item value is date format.

4. The image processing apparatus according to claim 1, wherein the processor causes the image processing apparatus to search the item name in a vicinity of the recognized item value.

5. The image processing apparatus according to claim 1, wherein the processor does not cause the image processing apparatus to specify the item name in a case where the item name is found by searching the item name.

6. The image processing apparatus according to claim 1, wherein the image is an image generated by a scanner.

7. An information processing method executed by an image processing apparatus, the information processing method comprising:
  performing character recognition on an image of a document;
  searching, based on a result of the character recognition, the image for an item name which corresponds to preregistered characters; and
  performing, in a case where the item name is not found by searching for the item name, a recognizing process for recognizing an item value which is included in the image based on the result of the character recognition and a predetermined condition, and then specify the item name based on the recognized item value, wherein the image includes the item value and an item name corresponding to the item value,
  wherein the recognizing process is not performed in a case where the item name is found by searching for the item name.

8. A non-transitory computer-readable storage medium storing a program that causes a computer to perform:
  performing character recognition on an image of a document;
  searching, based on a result of the character recognition, the image for an item name which corresponds to preregistered characters; and
  performing, in a case where the item name is not found by searching for the item name, a recognizing process for recognizing an item value which is included in the image based on the result of the character recognition and a predetermined condition, and then specify the item name based on the recognized item value, wherein the image includes the item value and an item name corresponding to the item value,
  wherein the recognizing process is not performed in a case where the item name is found by searching the item name.

* * * * *